United States Patent
Sudre

(10) Patent No.: US 11,519,282 B2
(45) Date of Patent: Dec. 6, 2022

(54) CERAMIC MATRIX COMPOSITE-BASED SEAL

(71) Applicant: UNITED TECHNOLOGIES CORPORATION, Farmington, CT (US)

(72) Inventor: Olivier H. Sudre, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 180 days.

(21) Appl. No.: 16/679,923

(22) Filed: Nov. 11, 2019

(65) Prior Publication Data

US 2021/0140334 A1 May 13, 2021

(51) Int. Cl.
*F01D 11/00* (2006.01)
*F16J 15/26* (2006.01)

(52) U.S. Cl.
CPC ............. *F01D 11/003* (2013.01); *F16J 15/26* (2013.01); *F05D 2240/55* (2013.01); *F05D 2300/6033* (2013.01); *F05D 2300/6034* (2013.01)

(58) Field of Classification Search
CPC .... F16J 15/26; F16J 15/30; F16J 15/16; F16J 15/0887; F01D 11/003; F05D 2240/55; F05D 2300/6033; F05D 2300/6034
See application file for complete search history.

(56) References Cited

U.S. PATENT DOCUMENTS

| | | | |
|---|---|---|---|
| 7,771,159 B2 | 8/2010 | Johnson et al. | |
| 8,974,891 B2 | 3/2015 | Riedell | |
| 9,757,920 B2 | 9/2017 | Lazur | |
| 2010/0096811 A1* | 4/2010 | Datta | C25D 7/00 204/474 |
| 2012/0087457 A1 | 4/2012 | Garnier et al. | |
| 2013/0115048 A1* | 5/2013 | Flanagan | F01D 9/023 415/110 |
| 2014/0363622 A1* | 12/2014 | Lazur | C04B 35/563 428/119 |
| 2017/0335705 A1* | 11/2017 | Tyler, Jr. | F01D 11/005 |
| 2018/0230064 A1* | 8/2018 | Lamusga | C04B 35/573 |
| 2018/0251921 A1* | 9/2018 | Shi | B22F 5/04 |
| 2018/0266261 A1* | 9/2018 | Overholser | B32B 18/00 |

OTHER PUBLICATIONS

The Extended European Search Report for European Patent Application No. 20206779.9, dated Mar. 16, 2021.

* cited by examiner

*Primary Examiner* — Gilbert Y Lee

(74) *Attorney, Agent, or Firm* — Carlson, Gaskey & Olds, P.C.

(57) ABSTRACT

A seal includes a ceramic matrix composite ply having woven ceramic-based fibers in a ceramic-based matrix. The ceramic matrix composite ply has at least one bend formed about a bend axis and defines at least one rounded portion. A sealed assembly and a method of making a seal are also disclosed.

18 Claims, 4 Drawing Sheets

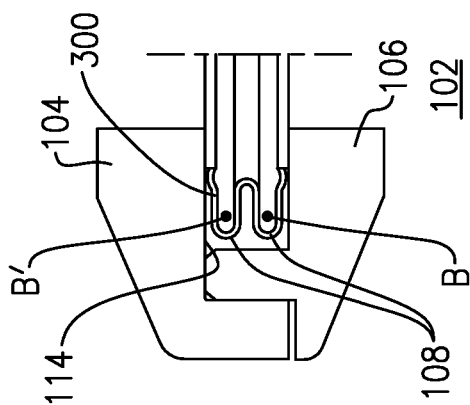
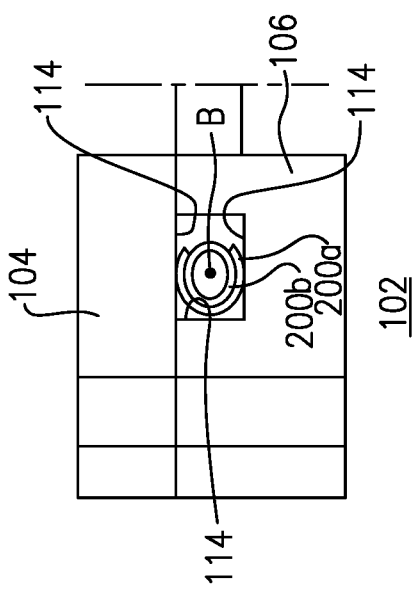
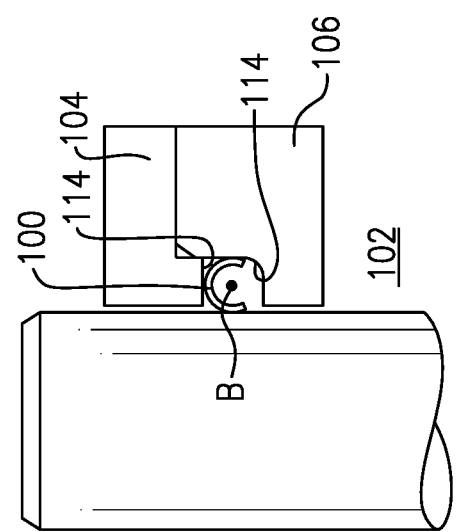

CERAMIC MATRIX COMPOSITE-BASED SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Various components in the gas turbine engine include seals to control airflow, such as cooling airflow, within the engine. Some of the gas turbine engine operate at very high temperatures and/or pressures. The seals must withstand the operating conditions of the section of the gas turbine engine in which they are situated.

SUMMARY

A seal, according to an example of this disclosure includes a ceramic matrix composite ply having woven ceramic-based fibers in a ceramic-based matrix. The ceramic matrix composite ply has at least one bend formed about a bend axis and defines at least one rounded portion.

In a further example of the foregoing, at least one bend includes a first bend and a second bend.

In a further example of any of the foregoing, the first bend is formed about a first bend axis and the second bend is formed about a second bend axis. The first bend axis and second bend axis are parallel to one another.

In a further example of any of the foregoing, at least one bend defines a tube shape.

In a further example of any of the foregoing, the woven ceramic based fibers include a first set of fibers oriented in a first direction and a second set of fibers oriented in a second direction and woven with the first set of fibers. The first set of fibers are angled with respect to the bend axis at an angle between about 0 and 60 degrees.

In a further example of any of the foregoing, the woven ceramic based fibers include a first set of fibers oriented in a first direction and a second set of fibers oriented in a second direction and woven with the first set of fibers. The relative volume fractions of the first set of fibers and the second set of fibers is between about 5% and 60%.

In a further example of any of the foregoing, the woven ceramic based fibers include a first set of fibers oriented in a first direction and a second set of fibers oriented in a second direction and woven with the first set of fibers. The relative volume fractions of the first set of fibers and the second set of fibers are between about 5% and 60%. The first set of fibers are angled with respect to the bend axis at an angle between about 0 and 60 degrees.

In a further example of any of the foregoing, the woven ceramic based fibers include a first set of fibers oriented in a first direction. A second set of fibers are oriented in a second direction and woven with the first set of fibers. A third set of fibers are oriented in a third direction and woven with the first and second sets of fibers.

A sealed assembly according to an example of this disclosure includes a first component, a second component, and a seal sealing the first component with respect to the second component. The seal includes a ceramic matrix composite ply which has woven ceramic-based fibers in a ceramic-based matrix. The ceramic matrix composite ply has at least one bend formed about a bend axis and defines at least one rounded portion.

In a further example of the foregoing, at least one bend includes a first bend and a second bend.

In a further example of any of the foregoing, the first bend is formed about a first bend axis and the second bend is formed about a second bend axis. The first bend axis and second bend axis are parallel to one another.

In a further example of any of the foregoing, at least one bend defines a tube shape.

In a further example of any of the foregoing, the woven ceramic based fibers include a first set of fibers oriented in a first direction and a second set of fibers oriented in a second direction and woven with the first set of fibers. The first set of fibers are angled with respect to the bend axis at an angle between about 0 and 60 degrees.

In a further example of any of the foregoing, the woven ceramic based fibers include a first set of fibers oriented in a first direction and a second set of fibers oriented in a second direction and woven with the first set of fibers. The relative volume fractions of the first set of fibers and the second set of fibers is between about 5% and 60%.

In a further example of any of the foregoing, the woven ceramic based fibers include a first set of fibers oriented in a first direction and a second set of fibers oriented in a second direction and woven with the first set of fibers. The volume fractions of the first set of fibers and the second set of fibers are between about 5% and 60%. The first set of fibers are angled with respect to the bend axis at an angle between about 0 and 60 degrees.

In a further example of any of the foregoing, each the first and second components have at least one mating face mating with the seal. At least one mating face is non-abrasive with respect to the seal.

In a further example of any of the foregoing, the sealed component is in a gas turbine engine.

A method of making a seal according to an example of this disclosure includes forming a single ply comprising woven ceramic-based fibers in a ceramic-based matrix to include at least one bend about a bend axis. The woven ceramic-based fibers define a weave direction, the woven ceramic based fibers include a first set of fibers oriented in a first direction and a second set of fibers oriented in a second direction and woven with the first set of fibers. The first set of fibers are angled with respect to the bend axis at an angle between about 30 and 60 degrees.

In a further example of the foregoing, the forming includes forming a first bend, and forming a second bend after forming the first bend.

In a further example of any of the foregoing, the forming includes introducing the at least one bend, and rigidizing the ply after introducing the bend.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIGS. 2A-C schematically show example seals for the gas turbine engine of FIG. 1.

DETAILED DESCRIPTION

Figure 1:
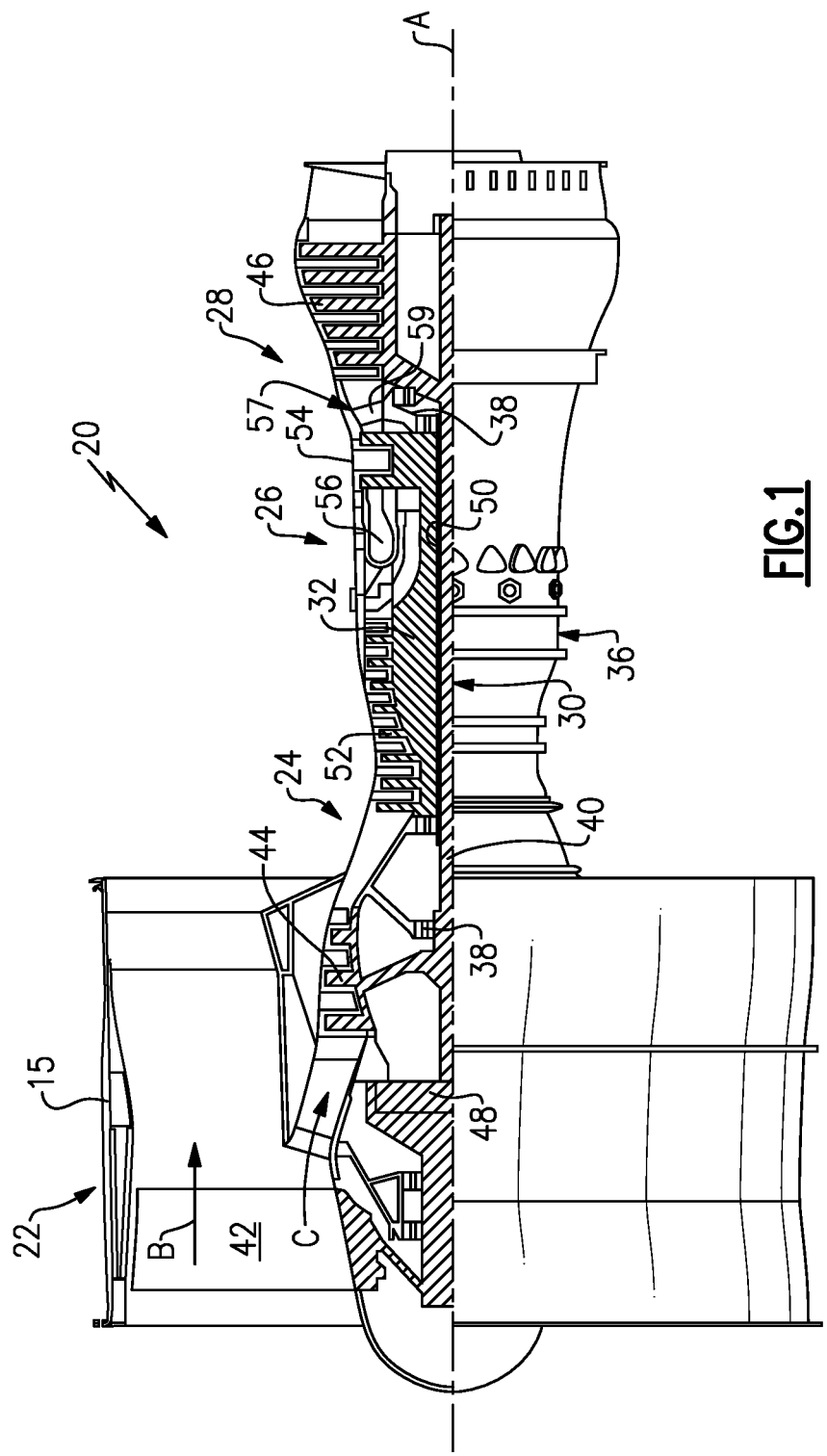
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° R)]^{0.5}$. The "Low corrected fan tip speed" as disclosed herein according to one non-limiting embodiment is less than about 1150 ft/second (350.5 meters/second).

The present application discloses an elastic or elastic/partially inelastic seal made of a single layer of ceramic matrix composite (CMC) that can be shaped into traditional elastic metallic seal shapes but has much greater temperature capability. Inelastic refers in the present context to the ability of the CMC material to deform beyond its elastic limit with some loss of properties but still providing some sealing capability.

FIGS. 2A-C schematically show example seals 100/200/300, respectively. The seals 100/200/300 seal a flow area 102 between respective components 104/106, for example, in order to control and retain air in a flow area 102. For instance, the airflow can be cooling airflow. Maintaining cooling airflow in the flow area 102 can improve cooling efficiency for the components 104/106.

In one example, the components 104/106 are in e.g., the compressor section 24, combustor section 26 or turbine section 28 of the engine 20. As an example, the components 104/106 are components of an airfoil assembly, such as in the compressor section 24 or turbine section 28. In a more particular example, the airfoil assembly includes a ceramic-based airfoil, such as a ceramic matrix composite (CMC) or a monolithic ceramic material, such as a silicon-containing ceramic. Other example components 104/106 are components of a valve or engine 20 casing structures.

The seal 100/200/300 is a CMC seal. In general, a CMC includes ceramic-based fibers in a ceramic-based matrix. The fibers can be carbide, oxide, or carbon fibers, or a combination thereof, in some examples. The matrix can be a glass, cermet, or other ceramic-based material, or combinations thereof. In some examples, the fibers are coated with an interface coating.

The CMC seal has a matrix density of above about 85%, preferably with no open porosity and in a particular example above 95% or greater. "Matrix density" refers to the density of material around the fiber and in some cases its interphases as measured by traditional techniques known to practitioners in the art.

The CMC seal 100/200/300 withstands high temperatures during operation of the engine 20. Other seals, such as metallic seals, may experience creep when exposed to high temperatures, which can reduce their sealing efficiency. Some seals are made from metallic materials with improved creep resistance, such as single crystal metallic alloys, however, those materials can have high cost and can be difficult to manufacture. Alternatively/additionally, metallic seals will require cooling that may impart complexity to the design. The CMC seal 100/200/300 is formed of a single thin ply, which allows the seal 100/200/300 to have some compliance, e.g., elastic properties that allow the CMC seal 100/200/300 to form/maintain a sealing relationship under compressive loads between components 104/106. A single ply means that the material is made into a single layer of woven material without any lamination step.

In one example, the modulus of elasticity of the CMC seal 100/200/300 is similar to the modulus of elasticity of metallic seals. In a particular example, the seal 100/200/300 has a modulus of elasticity of about 200 GPa. The CMC seal 100/200/300 has high temperature resistance, including improved creep resistance as compared to metallic seals. Furthermore, the CMC seal 100/200/300 has a relatively constant modulus of elasticity across wide temperature ranges, including the high operating temperatures of the engine 20.

The example seals 100/200/300 are face seals, e.g. have at least one bend that defines at least one rounded portion about an axis (discussed in detail below), and the sealing surfaces are normal to the axis. The seal 100/200/300 comprises at least one bend/at least one rounded portion and can in one example include a full circle, e.g., a tube shape. The example seals 100/200/300 can be axial seals (e.g., subject to compressive loads in two directions that are normal to one another) or radial seals (e.g., subject to compressive loads in one direction).

Figure 3A:
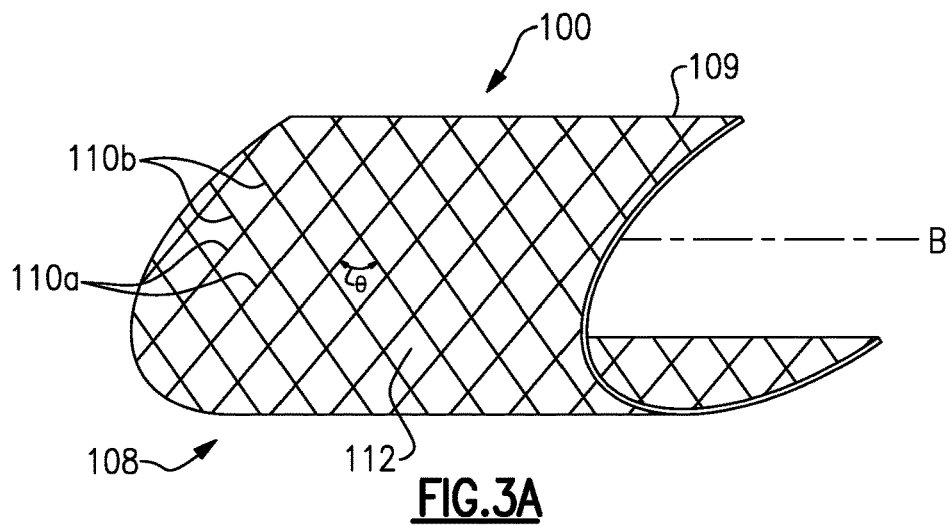
FIGS. 3A-C shows a detail view of the seal of FIG. 2A.
Figure 3B:
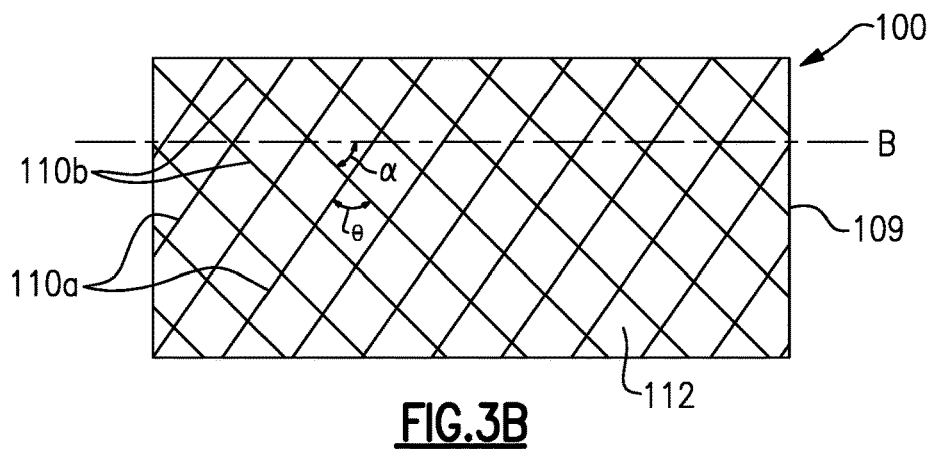
Figure 3C:
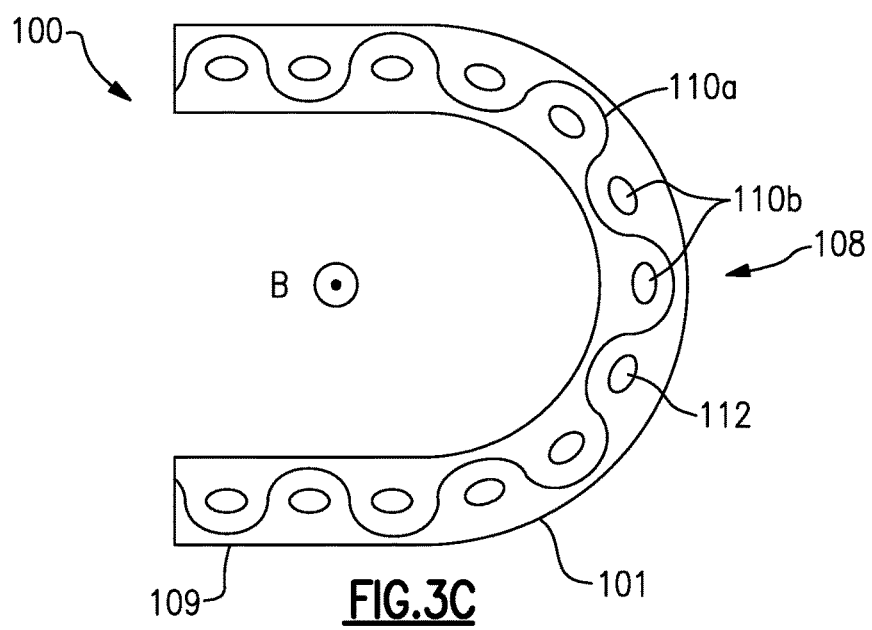

The example seal 100 of FIG. 2A is shown in detail in FIGS. 3A-C. The example seal 100 has a bend 108 that defines a C-shape or a U-shape about an axis B. Though the axis B in this example is linear, the B axis of the bend can follow a circular, partially circular or any other contour geometry. The exterior of the seal 100 provides a sealing surface 101 (FIG. 3C). The seal 100 comprises a ply 109 which includes ceramic fibers 110 disposed in a ceramic matrix 112. In some examples, the individual woven fibers can be bundles of fibers (known as tows) or ribbons of fibers. In further examples, the tows/ribbons can be woven, braided or knitted. The tows/ribbons can be processed prior to forming the ply 109 with various size or Denier. For instance, the processing may include flattening tows.

As shown, the woven fibers 110 include at least two sets of fibers 110a/110b that run in first and second directions, respectively, woven together. In the example of FIGS. 3A-C, there are two sets of fibers 110a/110b. The fibers 110b are oriented at an angle Θ with respect to the fibers 110a. The angle Θ can vary from 0 to 90 degrees. The first set of fibers 110a has an angle α (FIG. 3B) relative to the bend axis B of the seal 100. The angle α can be anywhere from 0 to 90 degrees.

The elasticity of the ply 109 is directional e.g., it varies from direction to direction. The elasticity in each direction is related to the ratio of amount of fibers 110a to fibers 110b, the angle Θ, and the angle α.

In one example, the ratio of amount of fibers 110a to 110b is expressed as a relative volume fraction. In a particular example, the relative volume fraction is between about 5% and 60%.

The fibers 110a/110b are oriented such that the weave direction is at an angle with respect to the axis B as discussed above so that the seal 100 has a stiffness that is highest in a direction normal to the axis B. Also, the fibers 110 have a minimum bend radius below which the fibers 110 can experience breakage. Accordingly, the fibers are oriented to enable the bend 108 to be formed substantially without any fiber 110 breakage.

In general, as α approaches 90 degrees, the stiffness and elastic limit of the seal 100 increases. However, when the fibers 110 are angled with respect to the bend axis B (e.g., when α is less than 90 degrees), the fibers 110 have a generally higher resistance to breakage. Fiber 110 can generally withstand bend 108 radii on the millimeter scale or larger depending on the fiber diameter and composition. For relatively large bend radii for bend 108, e.g., bend radii on the order of millimeters, in one example, α is about 90 degrees plus/minus 10 degrees. For relatively smaller bend radii, in one example, α is less than 90 degrees.

In general, an angle Θ that approaches 45 degrees results in a more compliant ply 109 along the bend axis B. In a particular example, the angle Θ is between about 0 and 60 degrees. In a more particular example, the angle Θ is between about 30 and 60 degrees.

In general, the more fibers 110a, the less compliant (stiffer) the ply 109 is with respect to the direction of bending at bend 108. In one example, the set of fibers 110b comprises more fibers than the set of fibers 110a. In other words, the weave has more fibers 110b running in the first direction than in the second direction. In a particular example the volume fractions of fibers 110a and fibers 110b in the composite are between about 5% and 60%.

Figure 4A:
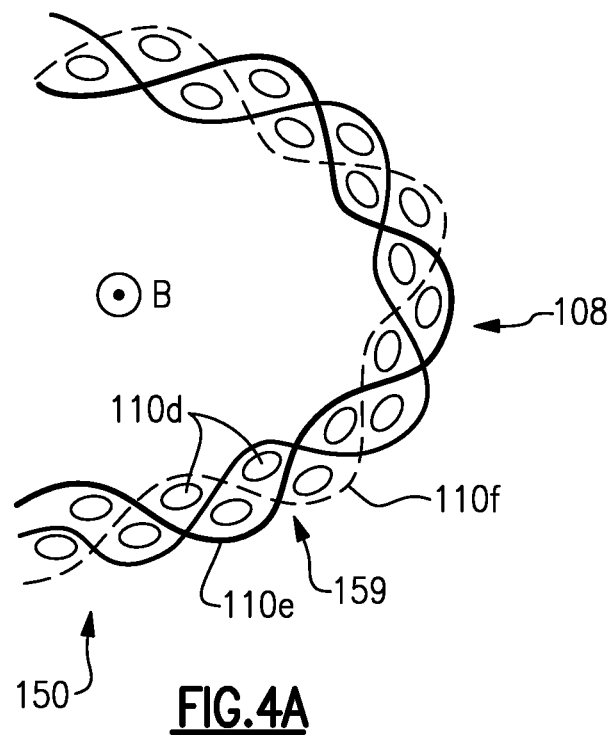
FIGS. 4A-B show a detail view of another example seal of FIG. 2A.
Figure 4B:
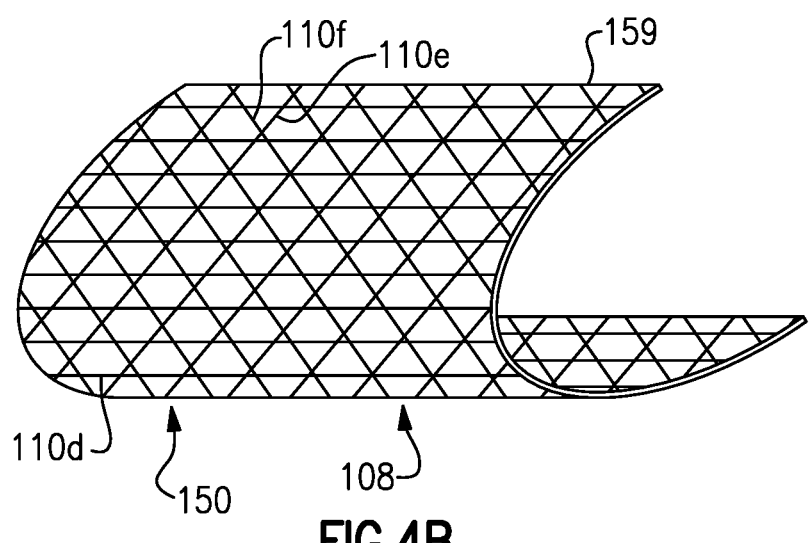

FIGS. 4A-B show another example seal 150 like the seal 100. The seal 150 is formed from a ply 159, which in example in FIG. 4B includes three sets of fibers (or tows/ribbons) 110d, 110e, 110f woven together into a triaxial braid. In the particular example of FIG. 4A, the ply 159 includes fibers 110 woven in a three-dimensional woven angle interlock architecture where fibers 110d are at an angle α=0 degrees (e.g., are aligned with) with bend axis B and fibers 110e, 110f are interlacing the fiber 110d.

As shown in the above examples, the seals 100/150 comprise a single ply 109/159. The single-ply composition of the seal 100/150 enables bending about bend axis B as discussed above because the compliant nature of CMC materials varies inversely with the thickness of the ply 109/159. In a particular example, the thickness of the ply 109/159 is less than about 200 microns (0.008 inches).

To make the seal 100/150, the ply 109/159 is made according to any known method. For instance, the fibers 110 are arranged as discussed above and infiltrated with the matrix material 112. The fibers 110 may also be coated with an interface material or protective coating prior or after their placement into a woven structure and prior to matrix infiltration, as would be known in the art. Other methods of making CMC are known in the art and can be implemented to make the ply 109/159. In one implementation, the fibers 110 can be woven into a ply 109/159 and then formed to include the bend 108 using tooling, such as on a mandrel to introduce the bend 108. Once the bend 108 is introduced, the ply 109/159 is densified and/or rigidized according to known methods to retain the bend 108. In another example, the seal 100/150 is formed by any known molding technique suitable for CMC materials. In another example, the seal 100/150 is formed by making a CMC tube and cutting the tube along its axis. In any of these examples, mating surfaces can be formed in the seal, depending on geometry of the components 104/106 which are to be sealed with the seal 100/150. In some examples, a coating can be applied to the sealing surface 101 (FIG. 3C) to smooth/protect the surface and improve the sealing efficiency of the seal 100.

FIG. 2B shows another example seal 200. In this example, the seal 200 includes two elements 200a/200b. Both elements 200a/200b are comprised of a ply 109 like the ply 109 of seal 100. Element 200a is a U-shape like seal 100/150. Element 200b, which is disposed inside element 200a, is a tube shape. Both elements 200a/200b are bent about the same axis B. The element 200b provides an added measure of leak-tightness for the seal 200, for instance, for high-compressive-load applications. Alternatively, 200a can be metallic to improve sealing performance and 200b provides support, stiffness and creep resistance. The seal 200 can incorporate any of the features discussed above with respect to the seals 100/150.

FIG. 2C shows another example seal 300. The seal 300 is comprised of a ply 109/159 like the ply 109/159 of seal 100/150. Seal 300 includes two bends 108 about axes B, B' that define a W-shape. The axes B, B' are parallel to one another. Accordingly, the weave direction of the ply 109/159 is the same with respect to both axes B, B'. Each of the two bends 108 are formed in succession in the ply 109 as discussed above. The seal 300 can incorporate any of the features discussed above with respect to the seals 100/150.

The components 104/106 have mating faces 114 (FIGS. 2A-C) which engage the seal 100/200/300. In one example, the mating faces 114 are deformable with respect to the seal 100/200/300. For example, the mating faces 114 can include a coating that is plastic with respect to the seal, or can be polished/smooth.

The example seals 100/200/300 have particular geometries, but it should be understood that other geometries or combinations of geometries are contemplated. For instance, a tube shape like the element is 200b of the seal 200 can be used as a seal on its own. As another example, a seal can have more than two bends to define an undulating shape. To that end, although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A seal, comprising:
  a ceramic matrix composite ply having woven ceramic-based fibers in a ceramic-based matrix, the ceramic matrix composite ply having a W-shape defined by first bend formed about a first bend axis and defining a first rounded portion and a second bend formed about a second bend axis and defining a second rounded portion, wherein the first bend axis and second bend axis are parallel to one another, and wherein the woven ceramic based fibers include a first set of fibers oriented in a first direction and a second set of fibers oriented in a second direction and woven with the first set of fibers, and the first set of fibers is angled with respect to the first and second bend axes at an angle between about 0 and 60 degrees.

2. The seal of claim 1, wherein the woven ceramic based fibers include a first set of fibers oriented in a first direction and a second set of fibers oriented in a second direction and woven with the first set of fibers, wherein the relative volume fractions of the first set of fibers and the second set of fibers is between about 5% and 60%.

3. The seal of claim 1, wherein the woven ceramic based fibers include a first set of fibers oriented in a first direction, a second set of fibers oriented in a second direction and woven with the first set of fibers, and a third set of fibers oriented in a third direction and woven with the first and second sets of fibers.

4. The seal of claim 1, wherein the ceramic matrix composite ply includes a central portion extending between the first and second bends.

5. A sealed assembly, comprising
  a first component;
  a second component; and
  a seal sealing the first component with respect to the second component, the seal including a ceramic matrix composite ply having woven ceramic-based fibers in a ceramic-based matrix, the ceramic matrix composite ply having a W-shape defined by a first bend formed about a first bend axis and defining a first rounded portion and a second bend and a second bend formed about a second bend axis and defining a second rounded portion, wherein the first bend axis and second bend axis are parallel to one another, and wherein the woven ceramic based fibers include a first set of fibers oriented in a first direction and a second set of fibers oriented in a second direction and woven with the first set of fibers, and the first set of fibers is angled with respect to the bend axes at an angle between about 0 and 60 degrees.

6. The sealed assembly of claim 5, wherein the woven ceramic based fibers include a first set of fibers oriented in a first direction and a second set of fibers oriented in a second direction and woven with the first set of fibers, and the first set of fibers is angled with respect to the first and second bend axes at an angle between about 30 and 60 degrees.

7. The sealed assembly of claim 5, wherein the woven ceramic based fibers include a first set of fibers oriented in a first direction and a second set of fibers oriented in a second direction and woven with the first set of fibers, wherein the relative volume fractions of the first set of fibers and the second set of fibers is between about 5% and 60%.

8. The sealed assembly of claim 5, wherein the woven ceramic based fibers include a first set of fibers oriented in a first direction and a second set of fibers oriented in a second direction and woven with the first set of fibers, wherein the relative volume fractions of the first set of fibers and the second set of fibers is between about 5% and 60%, and wherein the first set of fibers is angled with respect to the first and second bend axes at an angle between about 30 and 60 degrees.

9. The sealed assembly of claim 5, wherein each of the first and second components have at least one mating face mating with the seal, and the at least one mating face is non-abrasive with respect to the seal.

10. The sealed assembly of claim 9, wherein the at least one mating face is deformable with respect to the seal.

11. The sealed assembly of claim 9, wherein the at least one mating face includes a coating, and the coating is deformable with respect to the seal.

12. The sealed assembly of claim 5, wherein the sealed component is in a gas turbine engine.

13. The sealed assembly of claim 5, wherein the ceramic matrix composite ply includes a central portion extending between the first and second bends.

14. A method of making a seal, comprising:
forming a single ceramic matrix composite ply comprising woven ceramic-based fibers in a ceramic-based matrix into a W-shape including a first bend about a first bend axis and a second bend about a second bend axis, the first bend axis and the second bend axis being parallel to one another, wherein the woven ceramic-based fibers define a weave direction, the woven ceramic based fibers include a first set of fibers oriented in a first direction and a second set of fibers oriented in a second direction and woven with the first set of fibers, and the first set of fibers is angled with respect to the first and second bend axes at an angle between about 0 and 60 degrees.

15. The method of claim 14, wherein the forming includes forming the first bend, and forming the second bend after forming the first bend.

16. The method of claim 14, wherein the forming includes introducing at least one of the first and second bends into the ceramic matrix composite ply, and rigidizing the ceramic matrix composite ply after introducing at least one of the first and second bends.

17. The method of claim 14, further comprising forming the ceramic matrix composite ply to include a central portion extending between the first and second bends.

18. The method of claim 14, wherein the forming is by molding the ceramic matrix composite ply into the W-shape.

* * * * *